US007123199B2

(12) United States Patent
Rotta

(10) Patent No.: US 7,123,199 B2
(45) Date of Patent: Oct. 17, 2006

(54) IMPACT DEFLECTION SYSTEM

(75) Inventor: Phillip R Rotta, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 10/861,201

(22) Filed: Jun. 4, 2004

(65) Prior Publication Data

US 2006/0125701 A1 Jun. 15, 2006

(51) Int. Cl.
*H01Q 1/28* (2006.01)
*G01S 13/00* (2006.01)

(52) U.S. Cl. ........................................ 343/708; 342/61

(58) Field of Classification Search ................ 343/708, 343/705, 709, 711; 342/61, 62, 70, 71
See application file for complete search history.

(56) References Cited

U.S. PATENT DOCUMENTS 3,997,209 A * 12/1976 Chika ......................... 293/125
6,029,558 A * 2/2000 Stevens et al. ........... 89/36.17
6,203,079 B1 * 3/2001 Breed ......................... 293/119
6,749,218 B1 * 6/2004 Breed .......................... 342/72
6,883,631 B1 * 4/2005 Hu et al. .................... 180/274

* cited by examiner

*Primary Examiner*—Don Wong
*Assistant Examiner*—Ephrem Alemu
(74) *Attorney, Agent, or Firm*—Harness Dickey & Pierce P.L.C.

(57) ABSTRACT

An object deflection system includes at least one sensor for detecting an impending impact of a first object with a second object. The sensor communicates with a deflector deployment device to substantially instantaneously activate the deflector deployment device upon detecting the impending impact. When activated, the deflector deployment device substantially instantaneously deploys a deflector so that the first object impacts the deflector. The first object is therefore deflected by the deflector and prevented from impacting second object.

39 Claims, 6 Drawing Sheets

IMPACT DEFLECTION SYSTEM

FIELD OF INVENTION

The invention relates generally to a system for preventing a first object from impacting a second object.

BACKGROUND OF THE INVENTION

Broadband communication access, on which our society and economy is growing increasingly dependent, is becoming readily available to users on board mobile platforms such as aircraft, ships, trains, and automobiles. To provide this broadband access antenna arrays, e.g. satellite antenna arrays, are typically mounted to the fuselage of the mobile platform. Often these antennas are installed under a shroud, cover, or radome. Typically, the height of the antennas makes it prone to being struck by airborne objects, such as a bird, for which the radome provides little protection.

In the case of aircraft, simulations have shown that a bird strike against the rigidly mounted antenna can result in an impact force of up to 100,000 ft-lbs. The antenna and aircraft structure must be capable of absorbing and/or deflecting this force without the antenna or the aircraft structural failing. Such a failure could cause large portions of the antenna to break away while in flight, which can damage various parts of the aircraft, such as the vertical stabilizer, the horizontal stabilizer or the rear engines. An antenna structure capable of withstanding such an impact can be costly, heavy, and impractical without significant compromise to the satellite tracking performance of the antenna.

Generally, known devices for protecting an antenna, or other equipment mounted to the fuselage of the mobile platform, have been severely limiting to the performance of antenna, or equipment, and/or mobile platform. For example, typically such known devices limit antenna, equipment and/or mobile platform performance due to such things as signal blockage, increased weight, increased drag on the mobile platform, reduced control of the mobile platform, increased space consumption on fuselage of the mobile platform, and increased cost.

Therefore, it would be very desirable to provide a system for protecting such equipment from impacts with airborne objects without limiting the performance of the equipment. Furthermore, it would be very desirable to provide such an impact prevention system without incurring the cost of structurally reinforcing the equipment to withstand a high force impact.

BRIEF SUMMARY OF THE INVENTION

An object deflection system according to a preferred embodiment of the invention includes at least one sensor for detecting an impending impact of a first object with a second object. The sensor communicates with a deflector deployment device to substantially instantaneously activate the deflector deployment device upon detecting the impending impact. When activated, the deflector deployment device substantially instantaneously deploys a deflector so that the first object impacts the deflector. The first object is therefore deflected by the deflector and prevented from impacting second object.

For example, in one preferred form, the object deflection system described herein can be employed to prevent damage to equipment mounted to an exterior of a mobile platform by airborne objects striking the equipment. In a specific example, the object deflection system is employed to prevent bird strikes to a satellite antenna mounted on the fuselage of an aircraft.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
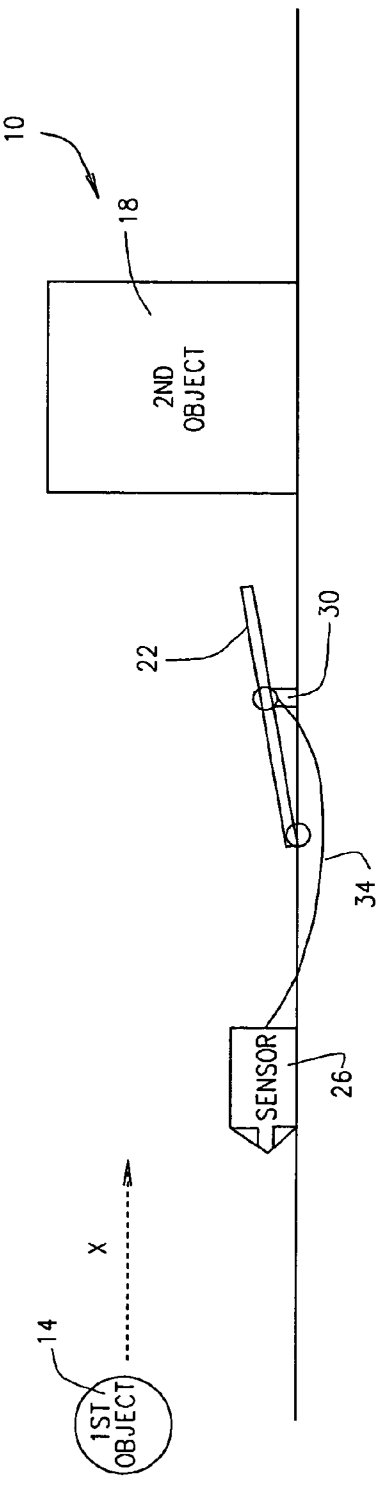
FIG. 1 is an illustration of an object deflection system, in accordance with a preferred embodiment of the present invention.

FIG. 1 illustrates an object deflection system 10 for preventing a first object 14 from impacting, or striking, a second object 18, in accordance with a preferred embodiment of the present invention. The first object 14 can be any object changing location with respect to the second object 18 in a direction X such that there is an impending impact between the first and seconds objects 14 and 18. For example, the first object 14 can be a rock or stone or other airborne debris, or a bird or other fowl. It should be understood that the change in relative position of the first and second objects 14 and 18 is with respect to each other. That is, the first object 14 can be moving toward the second object 18, or the second object 18 can be moving toward the first object 14 or the first and second objects 14 and 18 can be moving toward each other. However, for simplicity, the change in position between the first and second objects 14 and 18 will be referred herein in terms of the first object 14 traveling toward the second object 18. The second object 18 can be any object, device, apparatus or equipment exposed to potential impacts with another object. For example, the second object 18 can be equipment routinely exposed to an environment where it could be struck by airborne objects, such as equipment mounted to the exterior of a mobile platform.

The object deflection system 10 is especially well suited for implementations where the first object 14 is traveling at a high rate of speed toward the second object 18. And, due to the high rate of speed, the first object 14 would strike the second object 18 with a force that would cause considerable damage to the second object 18. However, the object deflection system 10 is also suited for other lower impact situations without departing from the spirit and the scope of the invention.

The system 10 includes a deflector 22, and a sensor 26 communicatively linked to a deflector deployment device 30. In a preferred form, the sensor 26 is communicatively linked to the deflector deployment device 30 via a deployment control line 34. Alternatively, the sensor 30 is communicatively connected to the deflector deployment device 30 via a wireless connection.

For simplicity and clarity, the deflection system 10 will be further described below with reference to implementation of the system 10 with a mobile platform, specifically an aircraft. However, it should be understood that the system 10 is versatile and capable of many other applications without departing from the spirit and the scope of the invention.

Figure 2:
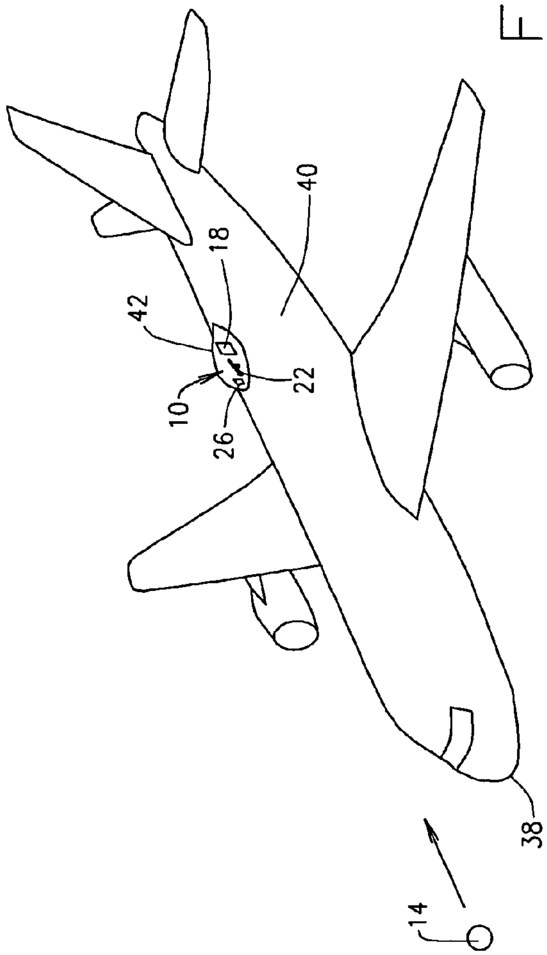
FIG. 2 is an illustration of the object deflection system shown in FIG. 1 implemented in combination with a mobile platform, shown as an aircraft.

FIG. 2 is an illustration of the system 10 implemented in combination with a mobile platform 38, shown as an aircraft, in accordance with one preferred embodiment of the present invention. The mobile platform 38 could also be represented in the form of other mobile platforms, such as a ship, a train or an automobile. The exemplary embodiment shown in FIG. 2 illustrates the system 10 mounted to the exterior of the fuselage 40 of the aircraft 38 and covered by a shroud 42. Such an installation exposes the second device 18 to sever damage if struck by an airborne first object 14, such as a bird.

Figure 3A:
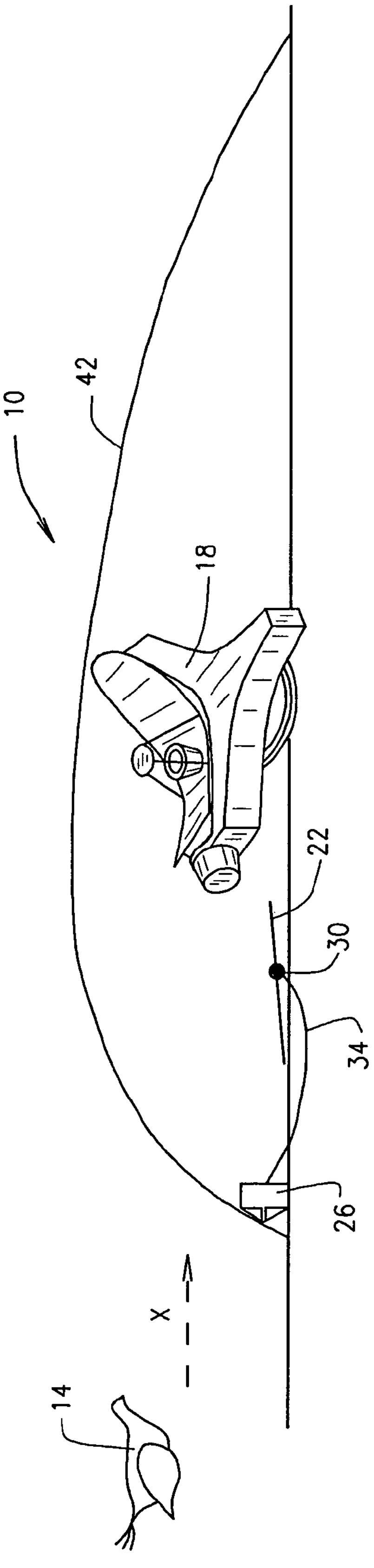
FIG. 3A is an illustration of an exemplary implementation the object deflection system shown in FIG. 1 wherein a deflector is shown in a non-deployed position.
Figure 3B:
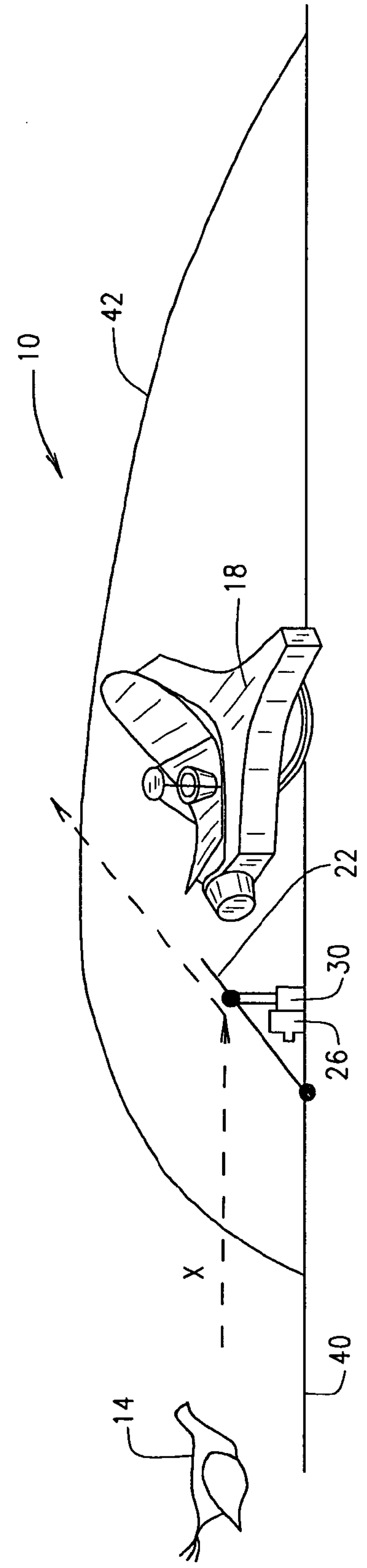
FIG. 3B is an illustration of an exemplary implementation the object deflection system shown in FIG. 1 wherein a deflector is shown in a deployed position.

FIGS. 3A and 3B illustrate an enlarged view of the system 10 in combination with the aircraft 38, shown in FIG. 2. For exemplary purposes, the first object 14 is shown as a bird and the second object 18 is shown as a satellite antenna. In accordance with this exemplary embodiment, the shroud 42 will also be referred to herein as a radome. In this embodiment, the system 10 is implemented to deflect the bird 14 and protect the satellite antenna 18 from being struck by the bird 14. FIG. 3A illustrates the deflector 22 in a non-deployed low profile position. In the non-deployed position, the deflector 22 does not interfere with the reception or transmission of signals to and from the satellite antenna 18. FIG. 3B illustrates the deflector 22 in a deployed position immediately following the bird 14 impacting the radome 42. Generally, when the bird 14 strikes the radome 42, and in most cases penetrates the radome 42, the impact sensor 26 senses the impact and thereby detects an impending impact of the bird 14 with the antenna 18.

The sensor 26 then substantially instantaneously communicates an activation signal to the deflector deployment device 30 to activate the deflector deployment device 30. The deflector deployment device 30 then substantially instantaneously deploys the deflector 22 to deflect the bird 14 before the bird 14 impacts the satellite antenna 18. The deflector 22 can be any shape suitable to protect the antenna 18 from being struck by the bird. For example the deflector 22 can be round, oval, square or rectangular. Additionally, the deflector 22 can be constructed of any material suitable to withstand the impact of the bird and deflect the bird away from the antenna 18. For example the deflector 22 can be constructed of a suitable composite or metallic material. More specifically, in one preferred form, the deflector 22 is constructed of a material that is slightly flexible but primarily rigid. Additionally, in the deployed position, the deflector 22 is positioned at an angle, relative to the fuselage 40, to adequately direct the bird away from the antenna 18 while minimizing the amount of force on impact the deflector 22 is required to withstand.

In most cases the bird 14 is traveling at such a high rate of speed, relative to the aircraft 38, that the deflected bird 14 will penetrate the radome 42 a second time and continue to travel past the antenna 18.

The impact sensor 26 can be any device suitable for sensing an impact to the radome 42 or to itself if a radome or shroud is not covering the system 10. For example, the sensor 26 can be a mechanical impact-sensing device such as an accelerometer or an acoustical device capable of rapidly detecting the loud noise associated with an impact. In other exemplary forms the sensor 26 can be a pressure sensor capable of detecting rapid changes in pressure, an electric wire for which conductivity is broken upon impact or a device capable of optically sensing the impact. In one preferred embodiment the deflector control line 34 consists of an electrical wire capable of electrically carrying the activation signal from the sensor 26 to the deflector deployment device 30. Alternatively, the deflector control line 34 can be any suitable means communicating the activation signal from the sensor 26 to the deflector deployment device 30. For example, the deflector control line 34 could be a tube capable of transferring pressurized gas or hydraulic fluid. In another preferred embodiment the sensor 26 wirelessly communicates the activation signal to the deflector deployment device 22

As shown in FIG. 3B, in one preferred form, the sensor 26 is coupled to the deflector deployment device 30. In this embodiment it is envisioned that the sensor 26 is an optical impact sensing device, an acoustical impact sensing device or a pressure sensitive impact sensing device.

The deflector 22 is hingedly attached to the fuselage 40 at a first end of the deflector 22 via a hinge mechanism 46. The deflector deployment device 30 is hingedly connected to the deflector 22 between the first end and an opposing second end of the deflector 22, via a suitable hinge mechanism. For example, the deflector deployment device 30 can be connected to the deflector using sliding hinge mechanism.

Figure 4:
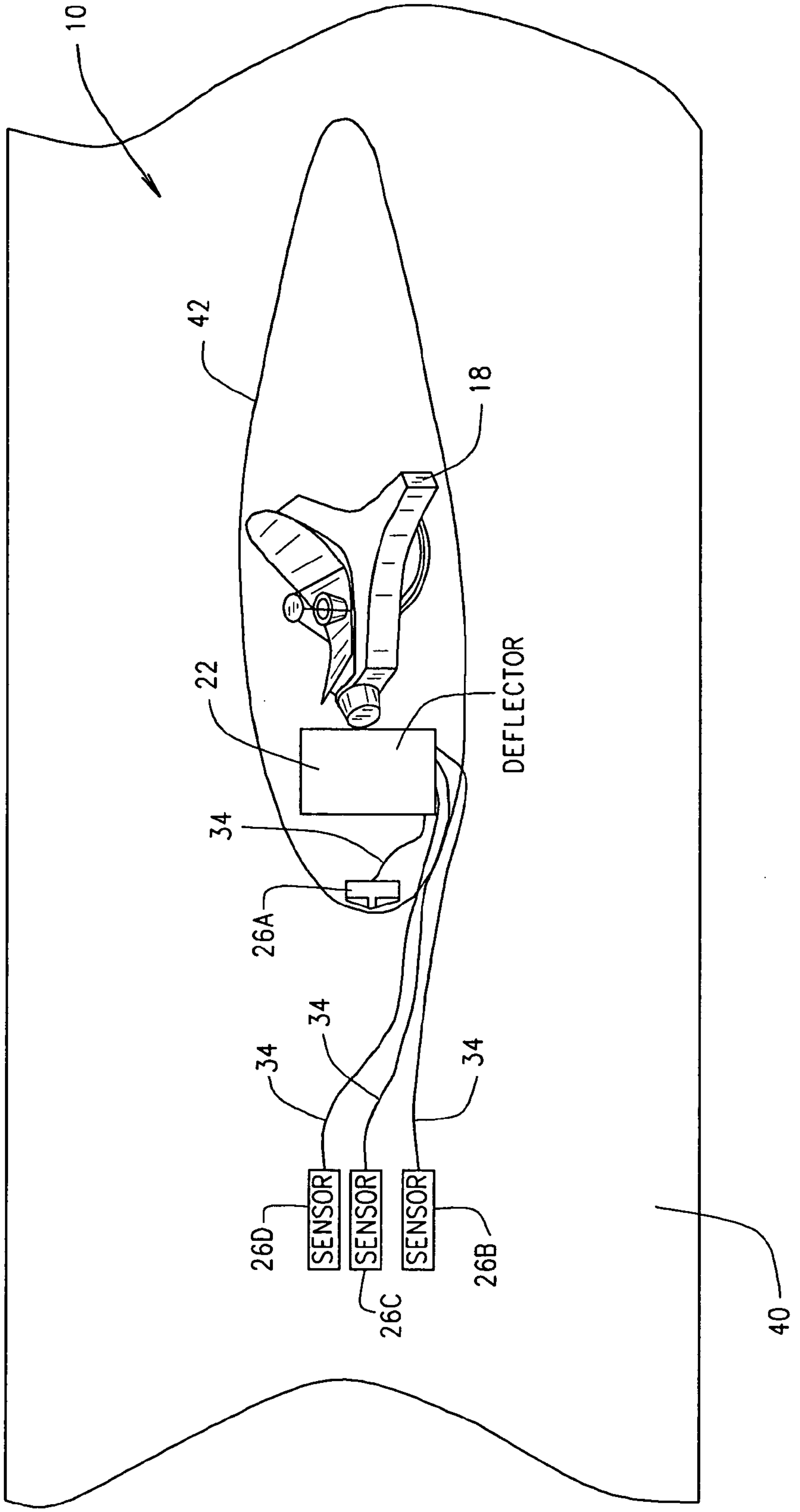
FIG. 4 illustrates a top view of an alternate preferred embodiment of the object deflection system shown in FIG. 1 including a plurality of impact sensors.

FIG. 4 illustrates a top view of an alternate preferred embodiment of the system including a plurality of impact sensors 26. For exemplary purposes, FIG. 4 shows the system 10 including four sensors indicated by the reference numerals 26A through 26D. In this embodiment, the object deflection system 10 includes a plurality of impact sensors, for example sensors 26B, 26C and 26D mounted to the fuselage 40 outside the radome 42. By positioning the sensors 26B, 26C and 26D a distance in front of the radome 42, the system 10 provides a greater length of time for the deflector deployment device 30 to deploy the deflector 22. More specifically, the time between at least one of the sensors 26B, 26C and/or 26D sensing the impending impact of the bird 14 with the antenna 18, and the bird 14 striking the deflector 22 is increased. This allows more time for the deflector deployment device 30 to fully deploy the deflector 22. Depending on the level of desired redundancy, the system 10 may also include the sensor 26A to be used as second level of sensing and thereby provide a higher degree of impact protection to the antenna 18.

Figure 5A:
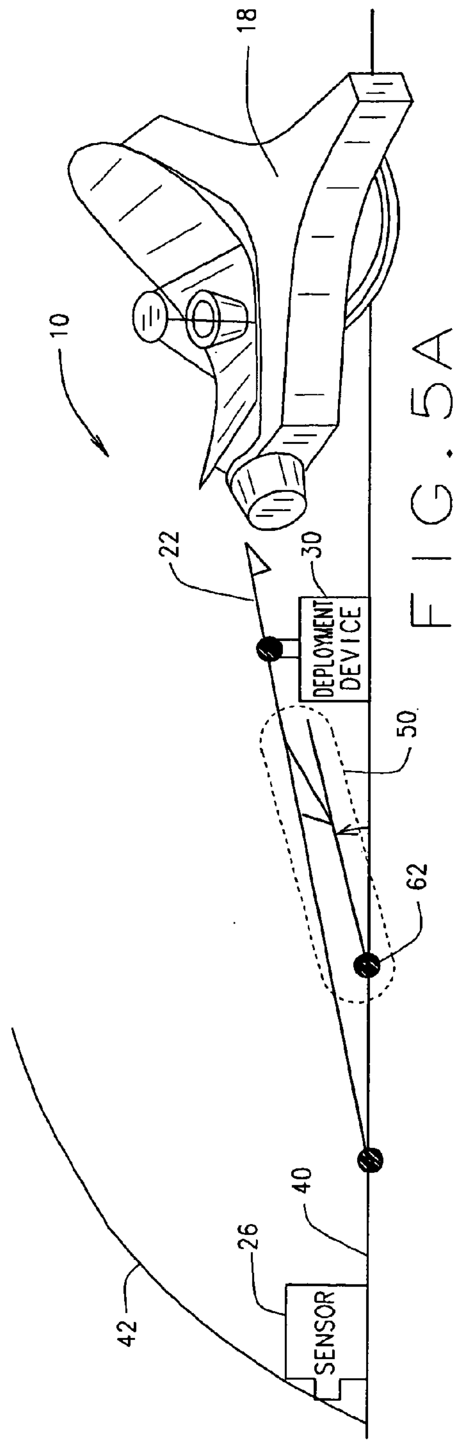
FIG. 5A is an illustration of another alternative embodiment of the impact deflection system shown in FIG. 1 including a stop mechanism shown in a non-deployed position.
Figure 5B:
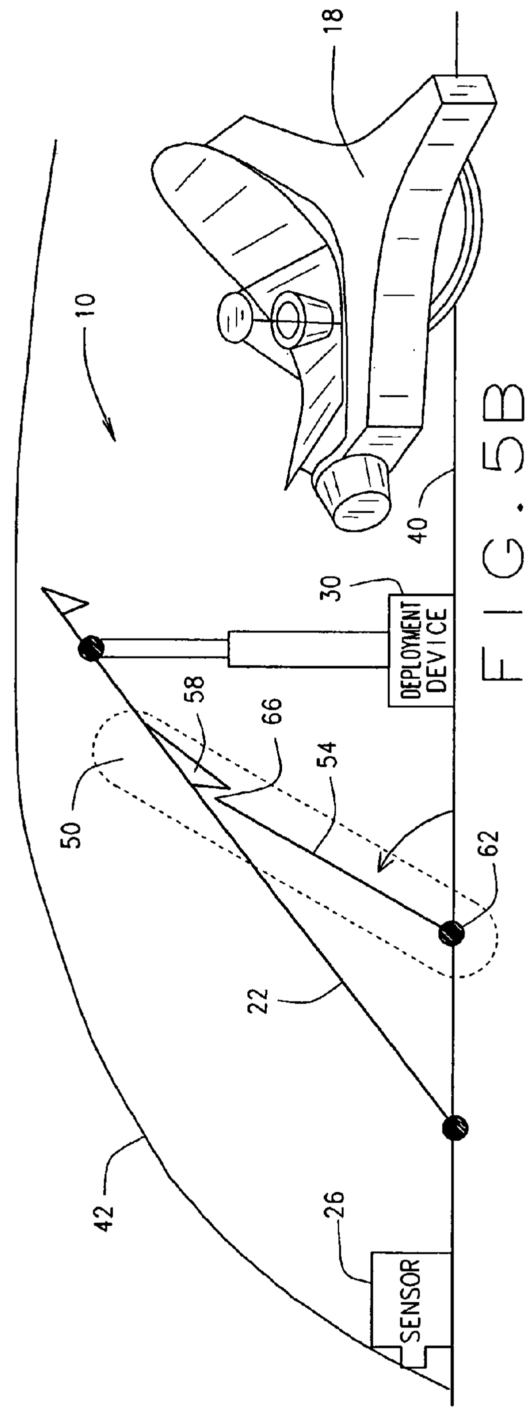
FIG. 5B is an illustration the stop mechanism shown in FIG. 5A illustrating the stop mechanism in a deployed position.

FIGS. 5A and 5B illustrate another alternative embodiment of the system 10 that includes a stop mechanism 50. The stop mechanism 50 includes a brace 54 and a latch 58 adapted to absorb the direct loads of the bird 14 striking the deflector 22. Thus, the mechanical load that the deflector 22 is required to withstand is reduced. FIG. 5A shows the stop mechanism 50 in a non-deployed position and FIG. 5B shows the stop mechanism 50 in a deployed position. It should be understood that the stop mechanism 50 can be any mechanism or device suitable to reduce the load requirements of the deflector 22 and that the stop mechanism 50 shown in FIGS. 5A and 5B is merely an exemplary embodiment. The brace 54 is generally a structurally rigid apparatus such as a metal or plastic rod or plate that is connected to the fuselage 40 by a biasing device 62, such as a spring. Therefore, when the deflector deployment device 30 deploys the deflector 22, the biasing device 62 deploys the brace 54 such that a distal end 66 is locked into place by the latch 58. Thus, when the bird 14 impacts the deflector 22, the brace 54 absorbs a portion of the energy imparted to the deflector 22 by the bird 14.

Figure 6:
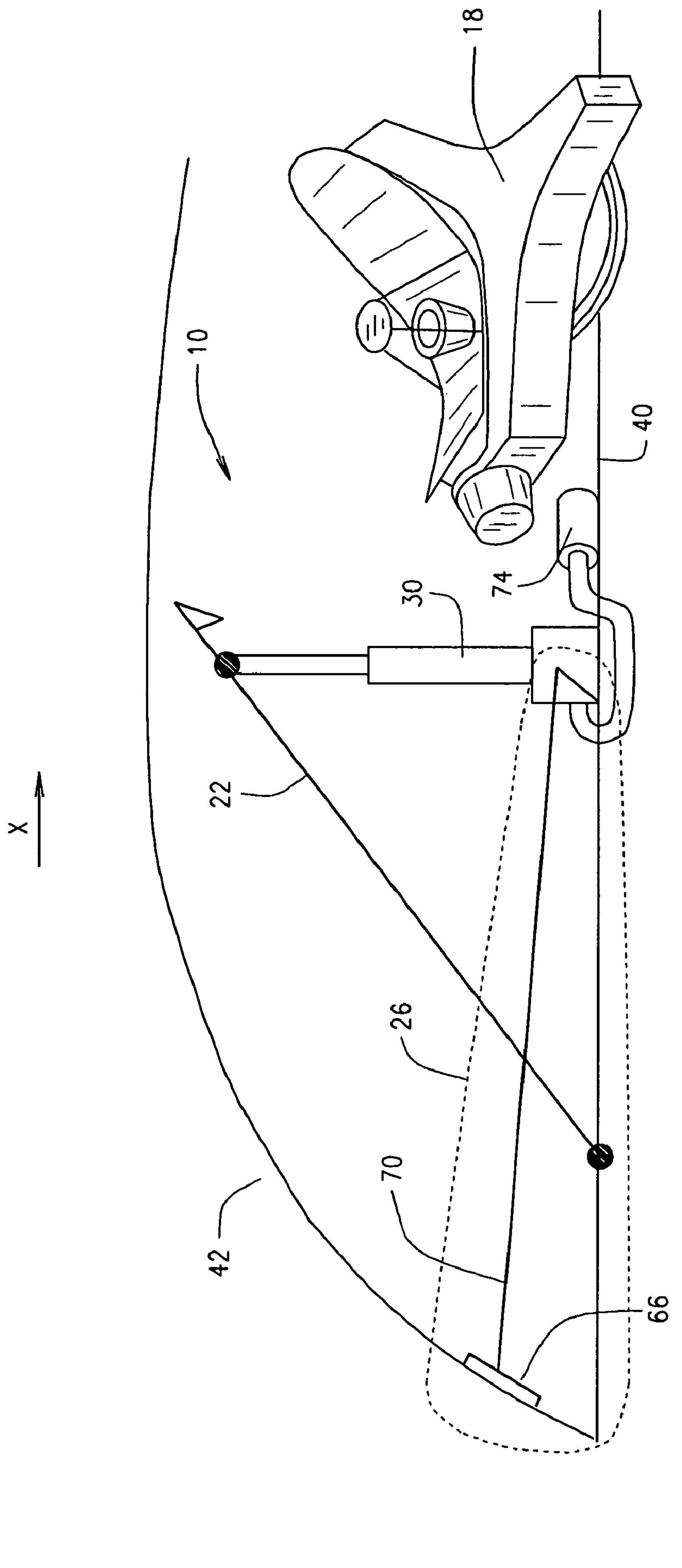
FIG. 6 is an illustration of another preferred embodiment of the object deflection system shown in FIG. 1, wherein a sensor comprises an impact plate connected to an energy transfer rod.
Figure 7:
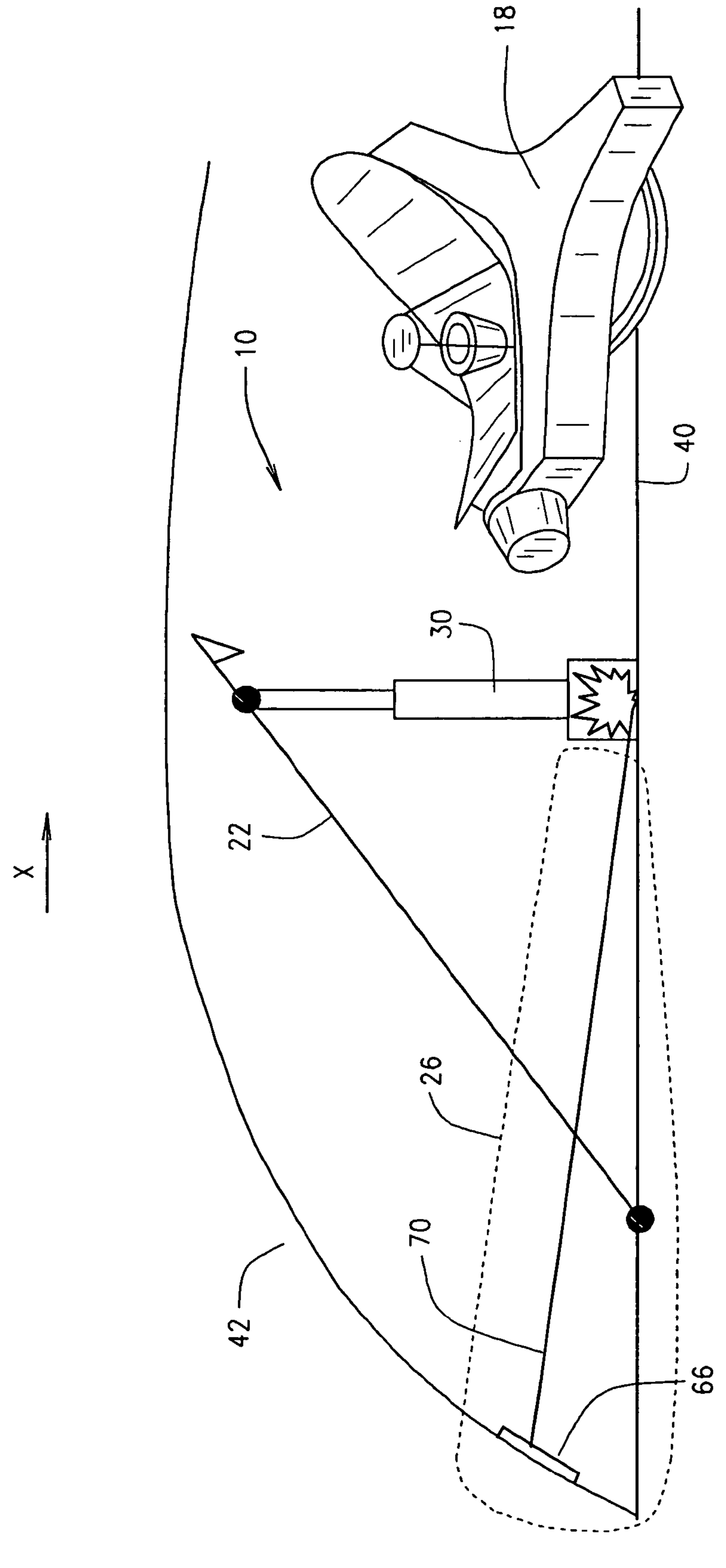
FIG. 7 is an illustration of one preferred form of a deployment device included in the object deflection system shown in FIG. 1.

Referring now to FIGS. 6 and 7, illustrating another preferred embodiment of the system 10, wherein the sensor 26 comprises an impact plate 66 connected to an energy transfer rod 70. The impact of the bird 14 on the front of the radome 42 and/or the impact plate 66 causes the energy transfer rod 70 to move in the direction X to activate the deflector deployment device 30.

Referring now to FIGS. 1 through 7, the deflector deployment device 30 can be any mechanism suitable to substantially deploy the deflector 22 when activated by the sensor 26. For example, as shown in FIG. 6, the deflector deployment device 30 can be a pneumatically or hydraulically operated piston device configured to substantially instantaneously extend when activated by the sensor 26. For example, the activation signal from the sensor 26 could trigger a rapid transfer of gas, e.g. $CO_2$, or pneumatic fluid from a local container 74 that would cause the piston device to substantially instantaneously deploy the deflector 22. Alternatively, as illustrated in FIG. 7, the deflector deployment device 30 can be an explosively operated piston that includes a squib or other small explosive device. Thus, when activated by the sensor 26 the squib explodes to substantially instantaneously extend the deflector deployment device 30. Further yet, the deflector deployment device 30 can be any suitable biasing device capable of substantially instantaneously deploying the deflector 22 when activated by the sensor 26.

This impact deflection system 10 utilizes the deflector 22 to protect the second object 18, e.g. an antenna from colliding with the first object 14, e.g. a bird, without compromising the integrity of the second object 18. In the case where the system 10 is employed on a mobile platform to protect a satellite antenna, in the non-deployed position, the system 10 does not interfere with the antenna tracking performance as a result of blockage by the deflector 22. In particular, the deflector remains flat and out of the view of the satellite radio frequency (RF) link during normal operation, thereby preventing compromises in satellite tracking performance. Additionally, deflecting the energy produced by a colliding bird before it can reach the satellite antenna, eliminates the need to burden the satellite antenna assembly design and mobile platform mechanical interface design with the technically challenging structure requirements to survive a bird strike.

While the invention has been described in terms of various specific embodiments, those skilled in the art will recognize that the invention can be practiced with modification within the spirit and scope of the claims.

What is claimed is:

1. An object deflection system comprising:

a sensor adapted to detect an impending impact of a first object with a second object;

a deflector adapted to prevent the first object from impacting second object; and a deflector deployment device adapted to be activated by the sensor upon detecting the impending impact and to deploy the deflector such that the first object impacts the deflector, thereby preventing the first object from impacting the second object.

2. The system of claim 1, wherein the sensor, deflector and second object are covered by a shroud and the sensor is further adapted to detect an impact to the shroud by the first object.

3. The system of claim 1, wherein the sensor comprises a mechanical impact sensing device adapted to transmit an activation signal to the deployment device upon detecting the impending impact.

4. The system of claim 1, wherein the sensor comprises an acoustical impact sensing device adapted to transmit an activation signal to the deployment device upon detecting the impending impact.

5. The system of claim 1, wherein the sensor comprises an electrical conductivity impact sensing device adapted to transmit an activation signal to the deployment device upon detecting the impending impact.

6. The system of claim 1, wherein the sensor comprises an optical impact sensing device adapted to transmit an activation signal to the deployment device upon detecting the impending impact.

7. The system of claim 1, wherein the sensor comprises a pressure sensitive impact sensing device adapted to transmit an activation signal to the deployment device upon detecting the impending impact.

8. The system of claim 1, wherein the sensor comprises an impact plate adapted to transfer energy to the deployment device, via an energy transfer rod, upon being impacted by the first object.

9. The system of claim 1, wherein the sensor is coupled to the deflector deployment device.

10. The system of claim 1, wherein sensor is communicatively linked to the deflector deployment device.

11. The system of claim 10, wherein the sensor is communicatively linked to the deflector via a wireless link.

12. The system of claim 10, wherein the sensor is communicatively linked to the deflector via a deployment control line.

13. The system of claim 12, wherein the deployment control line comprises one of an electrical wire, a gas transfer tube, a hydraulic transfer tube and an energy transfer rod.

14. The system of claim 1, wherein the deflector deployment device comprises a pneumatically operated piston device adapted to substantially instantaneously extend when activated by the sensor to deploy the deflector so that the first object is deflected and thereby prevented from impacting the second object.

15. The system of claim 1, wherein the deflector deployment device comprises a hydraulically operated piston device adapted to substantially instantaneously extend when activated by the sensor to deploy the deflector so that the first object is deflected and thereby prevented from impacting the second object.

16. The system of claim 1, wherein the deflector deployment device comprises an explosively operated piston device adapted to substantially instantaneously extend when activated by the sensor to deploy the deflector so that the first object is deflected and thereby prevented from impacting the second object.

17. The system of claim 1, wherein the deflector deployment device comprises a mechanical biasing device adapted to substantially instantaneously extend when activated by the sensor to deploy the deflector so that the first object is deflected and thereby prevented from impacting the second object.

18. The system of claim 1, wherein the system further comprises a plurality of sensors, wherein each sensor is adapted to detect the impending impact of the first object with the second object and activate the deflector deployment device.

19. The system of claim 1, wherein the system further comprises a stop mechanism adapted to reduce a mechanical load requirement of the deflector deployment device needed to absorb the impact of the first object.

20. A method for preventing a first object from impacting a second object, said method comprising:

sensing an impending impact of a first object with a second object;

communicating an activation signal to a deflector deployment device upon sensing the impending impact;

activating the deflector deployment device upon receiving the activation signal; and deploying a deflector upon activation of the deflector deployment device so that the first object impacts the deflector and is thereby prevented from impacting the second object.

21. The method of claim 20, wherein sensing the impending impact comprises detecting an impact by the first object to a shroud covering the deflector, the deflector deployment device and the second object.

22. The method of claim 20, wherein communicating the activation signal comprises transmitting an electrically generated signal to the deflector deployment device from one of:

a mechanical impact sensing device;

an acoustical impact sensing device;

an electrical conductivity impact sensing device;

an optical impact sensing device; and a pressure sensitive impact sensing device.

23. The method of claim 20, wherein communicating the activation signal comprises transferring energy from an impact plate to the deflector deployment device, via an energy transfer rod, upon the impact plate being impacted by the first object.

24. The method of claim 20, wherein communicating the activation signal comprises transmitting an electrically generated signal from an impact sensor coupled to the deflector deployment device.

25. The method of claim 20, wherein communicating the activation signal comprises transmitting an electrically generated signal from an impact sensor to the deflector deployment device utilizing one of a wireless communication link and a deployment control line.

26. The method of claim 20, wherein activating the deflector deployment device comprises, upon receiving the activation signal, substantially instantaneously activating one of:

a pneumatically operated piston device, a hydraulically operated piston device, an explosively operated piston device, and a mechanical biasing device, thereby substantially instantaneously deploying the deflector so that the first object is deflected and prevented from impacting the second object.

27. The method of claim 20, wherein sensing the impending impact of the first object comprises utilizing a plurality of sensors to detect the impending impact of the first object with the second object and activate the deflector deployment device.

28. The method of claim 20, wherein deploying the deflector upon activation of the deflector deployment device comprises reducing a mechanical load requirement of the deflector deployment device needed to absorb the impact of the first object utilizing a stop mechanism.

29. A mobile platform antenna protection system comprising:

a deflector adapted to prevent an object from impacting an antenna coupled to a fuselage of the mobile platform;

a deflector deployment device adapted to deploy the deflector; and a sensor communicatively linked to the deflector deployment device, the sensor adapted to:

detect an impending impact of the object with the antenna; and activate the deflector deployment device upon detection of the impending impact such that the object impacts the deflector and is thereby prevented from impacting the antenna.

30. The system of claim 29, wherein the sensor, deflector and antenna are covered by a radome and the sensor is further adapted to detect an impact to the radome by the object.

31. The system of claim 29, wherein the sensor comprises at least one of:

a mechanical impact sensing device adapted to transmit an activation signal to the deployment device upon detecting the impending impact;

an acoustical impact sensing device adapted to transmit an activation signal to the deployment device upon detecting the impending impact;

an electrical conductivity impact sensing device adapted to transmit an activation signal to the deployment device upon detecting the impending impact;

an optical impact sensing device adapted to transmit an activation signal to the deployment device upon detecting the impending impact;

a pressure sensitive impact sensing device adapted to transmit an activation signal to the deployment device upon detecting the impending impact; and an impact plate adapted to transfer energy to the deployment device, via an energy transfer rod, upon being impacted by the object.

32. The system of claim 29, wherein the sensor is coupled to the deflector deployment device.

33. The system of claim 29, wherein sensor is communicatively linked to the deflector deployment device.

34. The system of claim 33, wherein the sensor is communicatively linked to the deflector via a wireless link.

35. The system of claim 33, wherein the sensor is communicatively linked to the deflector via a deployment control line.

36. The system of claim 35, wherein the deployment control line comprises one of an electrical wire, a gas transfer tube, a hydraulic transfer tube and an energy transfer rod.

37. The system of claim 29, wherein the deflector deployment device comprises one of a pneumatically operated piston device, a hydraulically operated piston device, an explosively operated piston device and a mechanical biasing device adapted to substantially instantaneously extend when activated by the sensor to deploy the deflector so that the object is deflected and thereby prevented from impacting the antenna.

38. The system of claim 29, wherein the system further comprises a plurality of sensors, wherein each sensor is adapted to detect the impending impact of the object with the antenna and activate the deflector deployment device.

39. The system of claim 29, wherein the system further comprises a stop mechanism adapted to reduce a mechanical load requirement of the deflector deployment device needed to absorb the impact of the object.

* * * * *